US005122882A

United States Patent [19]

Ishida et al.

[11] Patent Number: 5,122,882

[45] Date of Patent: Jun. 16, 1992

[54] THERMAL TRANSFER RECORDING METHOD AND APPARATUS WITH CONTROL RECORDING MEDIUM BEFORE, DURING, AND FOLLOWING RECORDING

[75] Inventors: Yasushi Ishida, Tokyo; Akihiro Tomoda, Yokohama; Minoru Yokoyama, Yokohama; Takashi Awai, Yokohama; Satoshi Wada, Kawasaki; Takehiro Yoshida, Tokyo; Hisao Terajima; Takeshi Ono, both of Yokohama; Makoto Kobayashi, Tama, all of Japan

[73] Assignee: Canon Kabushiki Kaisha, Tokyo, Japan

[21] Appl. No.: 409,799

[22] Filed: Sep. 20, 1989

[30] Foreign Application Priority Data

Sep. 22, 1988 [JP] Japan ............................ 63-236370

[51] Int. Cl.[5] ...................... H04N 1/23; B41J 2/325; B41J 17/04; B41J 17/06

[52] U.S. Cl. ............................ 358/296; 346/76 PH; 400/232

[58] Field of Search .................. 358/296; 346/76 PH; 400/120, 232, 234, 226

[56] References Cited

U.S. PATENT DOCUMENTS

| | | | |
|---|---|---|---|
| 4,442,460 | 4/1984 | Kurata | 358/296 |
| 4,447,832 | 5/1984 | Kurata et al. | 358/296 |
| 4,456,392 | 6/1984 | Nozaki | 400/120 |
| 4,531,135 | 7/1985 | Toshima . | |
| 4,577,199 | 3/1986 | Saiki et al. | 346/76 PH |
| 4,703,346 | 10/1987 | Bierhoff . | |

FOREIGN PATENT DOCUMENTS

| | | |
|---|---|---|
| 58-201686 | 11/1983 | Japan . |
| 60-83864 | 5/1985 | Japan . |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

There is disclosed a thermal transfer recording apparatus utilizing an ink sheet and a recording sheet, provided with a thermal head, an ink sheet feeding mechanism, and a recording sheet feeding mechanism, in which, after the image recording, the ink sheet is fed at a speed lower than that of the recording sheet, thereby preventing the formation of creases or slack in the ink sheet.

40 Claims, 11 Drawing Sheets

THERMAL TRANSFER RECORDING METHOD AND APPARATUS WITH CONTROL RECORDING MEDIUM BEFORE, DURING, AND FOLLOWING RECORDING

BACKGROUND OF THE INVENTION

1. Field of the Invention

The present invention relates to a thermal transfer recording method for transferring the ink contained on an ink sheet onto a recording medium thereby recording an image thereon, and an apparatus adapted for effecting said method.

The above-mentioned thermal transfer recording apparatus includes a facsimile apparatus, an electronic typewriter, a copying machine, a printer or like.

2. Related Background Art

In general, the image recording in a thermal transfer printer is achieved by utilizing an ink sheet formed by coating a base film with a heat-fusible (or heat-sublimable) ink, selectively heating said ink sheet corresponding to image signal with a thermal head and transferring thus fused (or sublimed) ink onto a recording sheet. Said ink sheet is usually a so-called one-time ink sheet which completely loses the ink after an image recording, so that it is necessary, after the recording of a character or a line, to advance the ink sheet by amount corresponding to said recording, in order to securely bring the unused portion of the ink sheet to the next recording position. This fact increases the amount of use of the ink sheet, so that the running cost of a thermal transfer printer tends to be higher than that of the ordinary thermal printer in which the recording is made on thermal recording paper.

In order to solve such drawbacks a thermal transfer printer in which the recording sheet and the ink sheet are advanced with different speeds is proposed for example in the U.S. Pat. No. 4,456,392, the Japanese Laid-open Patent Sho 58-201686 and the Japanese Patent Publication Sho 62-58917. Also as described in said patent references, there is already known so-called multi print sheet, which is an ink sheet capable of plural image recordings, and, in continuous recording of a length L, such a multi print sheet allows users to reduce the amount of advancement of the ink sheet, during or after the image recording, to less than said length L (L/n: $n>1$). Such method improves the efficiency of use of the ink sheet to n times, so that a reduction in the running cost of the thermal transfer printer can be expected. This method is hereinafter called the multi-printing method.

In a thermal transfer printer for such multi-printing method, the ink sheet may generate creases or slack due to the friction between the ink sheet and the recording sheet, since the moving speed of the ink sheet is smaller than that of the recording sheet. Also in such printer, there is usually provided a cutter for cutting the recorded sheet into respective pages, and the presence of such cutter is preferable in a facsimile apparatus. However, the creases or slack in the ink sheet tends to appear more strongly in the presence of said cutter, because it is necessary to feed the recording sheet toward the cutter (so-called front feeding) after the recording of a page, and to reverse the recording sheet after the cutting operation of the cutter, until the leading end of the sheet comes close to the recording position with the thermal head (so-called back feeding).

SUMMARY OF THE INVENTION

An object of the present invention is to provide a thermal transfer recording method capable of improving the image quality, and a recording apparatus employing said method.

Another object of the present invention is to provide a thermal transfer recording method capable of reducing the consumption of the ink sheet and a recording apparatus employing said method.

Still another object of the present invention is to provide a thermal transfer recording method capable of reducing the running cost and a recording apparatus employing said method.

Still another object of the present invention is to provide a thermal transfer recording method capable of preventing the formation of creases or slack in the ink sheet and the surface smudge on the recording medium, by transporting the ink sheet by a predetermined amount in response to the transportation of the recording medium, and a recording apparatus employing said method.

Still another object of the present invention is to provide a facsimile apparatus employing a thermal transfer recording method capable of improving the image quality.

DESCRIPTION OF THE PREFERRED EMBODIMENTS DETAILED

Now the present invention will be clarified in detail by an embodiment thereof shown in the attached drawings.

Explanation of facsimile apparatus (FIGS. 1 to 4)

Figure 1:
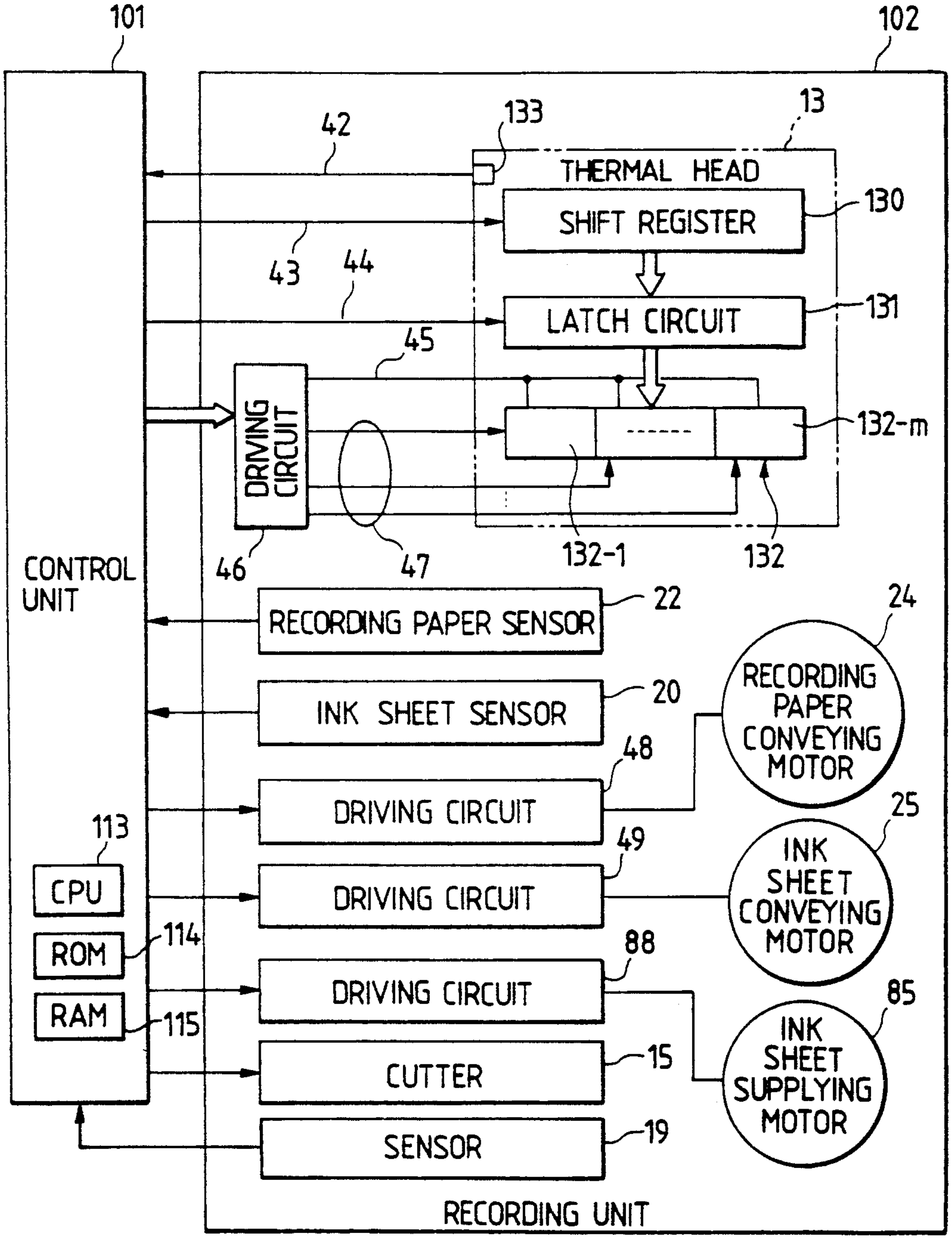
FIG. 1 is a view showing electrical connections between a control unit and a recording unit in a facsimile apparatus embodying the present invention.
Figure 2:
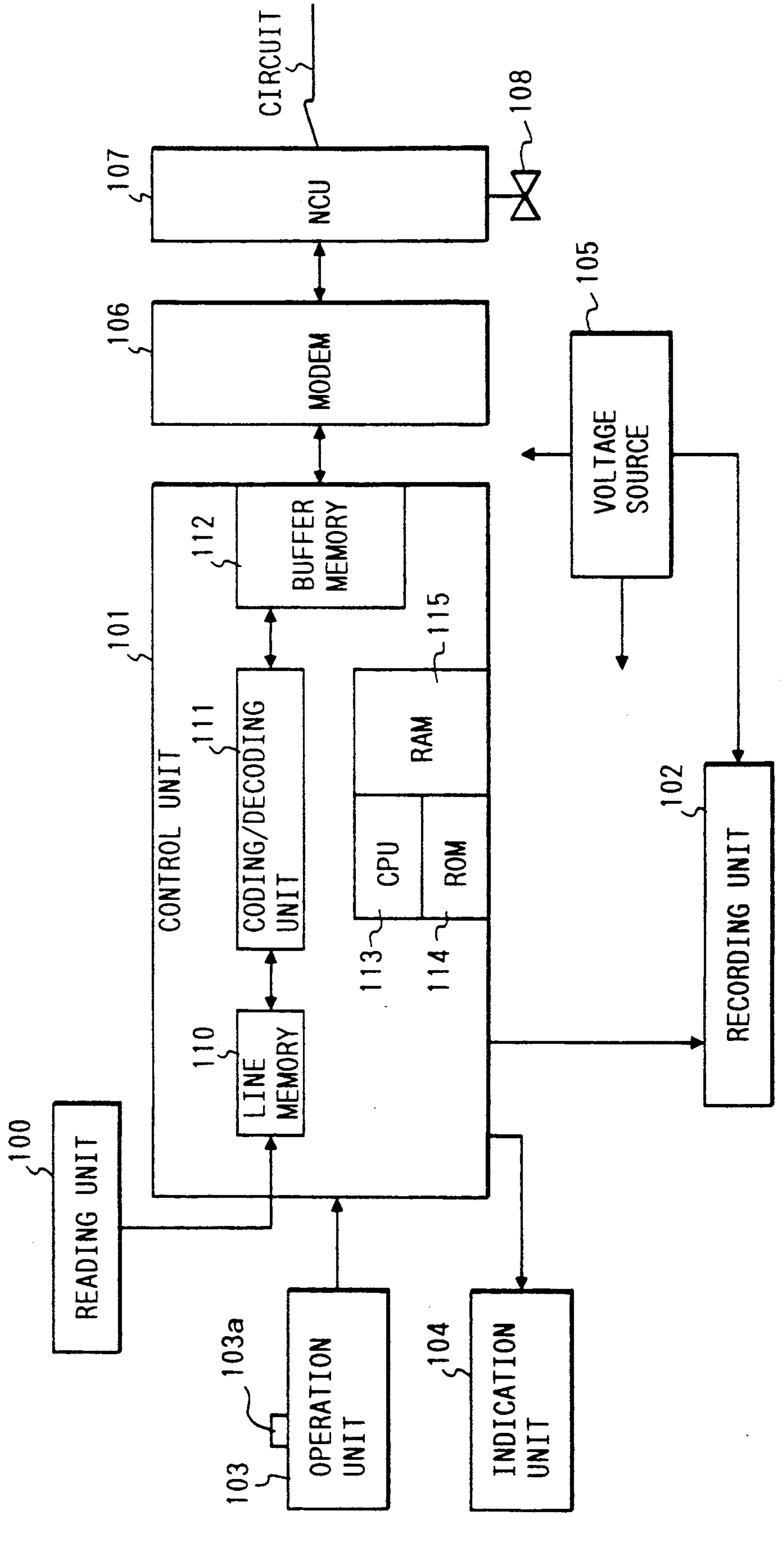
FIG. 2 is a block diagram of a facsimile apparatus embodying the present invention.

FIGS. 1 to 4 illustrate the thermal transfer printer of the present invention applied in a facsimile apparatus, wherein FIG. 1 is a view showing electrical connection between a control unit and a recording unit; FIG. 2 is a schematic block diagram of said facsimile apparatus; FIG. 3A is a lateral cross-sectional view thereof; and FIG. 3B is an external perspective view thereof.

At first the structure will be briefly explained with reference to FIG. 2.

In FIG. 2, a reading unit 100 for photoelectrically reading an original image and supplying a control unit 101 with digital image signals is provided with an original conveying motor and a CCD image sensor. A control unit 101 has the following structure. A line memory 110, for storing image data of each line serves to store the image data of a line from the reading unit 100 in case of the transmission or the copying, or the decoded image data of a line in case of the image data reception. Image formation is conducted by the supply of the stored data to a recording unit 102. An encoding/decoding unit 111 serves to encode the image information to be transmitted, for example by MH encoding, and to decode the received encoded data into image data. A buffer memory 112 stores the encoded image data to be transmitted or the received encoded data. The various units of the control unit 101 and the entire apparatus are controlled by a CPU 113 such as a microprocessor. The control unit 101 is further provided, in addition to the CPU 113, with a ROM 114 storing the control program of the CPU 113 and other data, and a RAM 115 for temporarily storing various data, as a work area of the CPU 113.

The recording unit 102 is provided with a thermal line head for image recording on the recording sheet by means of the thermal transfer recording method, of which structure will be explained in detail later with reference to FIG. 1. An operation unit 103 is provided with function keys operations such as starting the transmission, and input keys for entering a telephone number. A switch 103*a* to be operated by the operator indicates the kind of the ink sheet to be employed; a multi-printing ink sheet when it is on, or an ordinary ink sheet when it is off. There are further provided an indicating unit 104, provided in the operation unit 103 for indicating the status of the apparatus and various functions; a power supply unit 105 for supplying the electric power to the entire apparatus; a modem (modulation/demodulation unit) 106; a network control unit (NCU) 107; and a telephone unit 108.

Figure 3A:
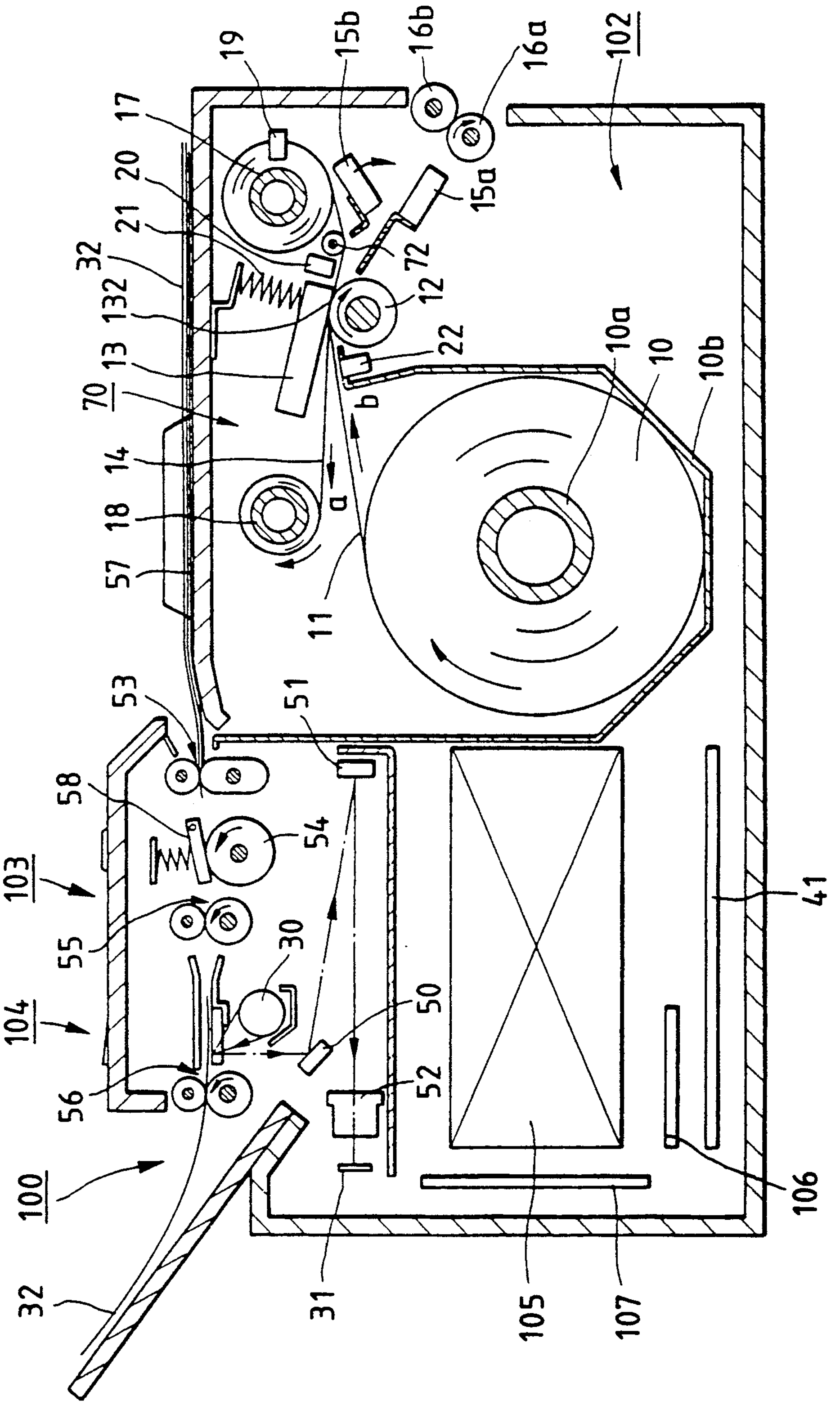
FIG. 3A is a lateral cross-sectional view of said facsimile apparatus.
Figure 3B:
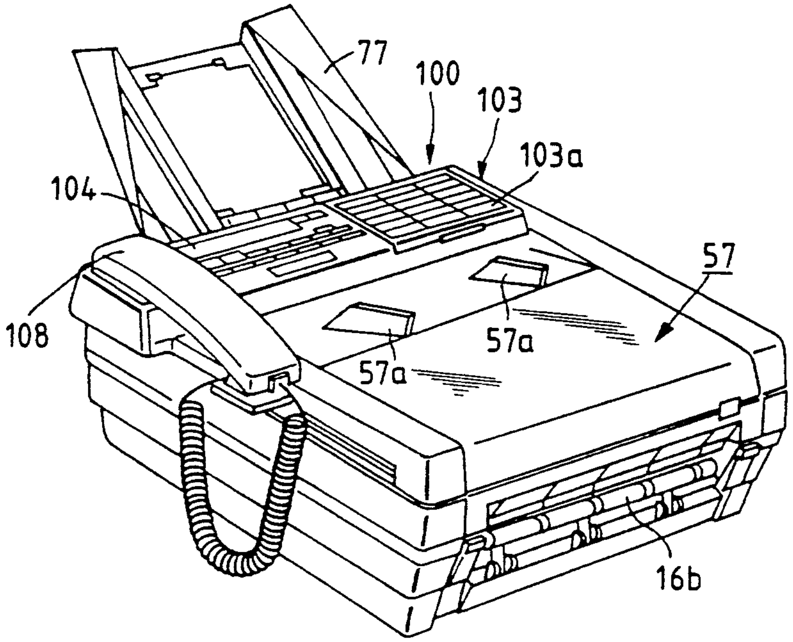
FIG. 3B is an external perspective view of said facsimile apparatus.

Now reference is made to a lateral cross-sectional view in FIG. 3A and an external perspective view in FIG. 3B for explaining the structure of the recording unit 102, wherein the same components as those in FIG. 2 are represented by the same numbers.

Referring to these drawings, plain paper or the recording sheet 11 is stored as a roll 10 wound around a core 10*a*. Said rolled paper 10 is rotatably housed in the apparatus, so as to feed the recording sheet 11 to a thermal head 13 by the rotation, in a direction indicated by an arrow, of the platen roller 12 driven by a recording sheet conveying motor 24. A rolled sheet loading unit 10*b* detachably contains the rolled sheet 10. The platen roller 12 serves to transport the recording sheet 11 in a direction b, and to press an ink sheet 14 and the recording sheet 11 against a heat-generating member 132 of the thermal head 13. After the image recording with the thermal head 13, the recording sheet 11 is conveyed toward discharge rollers 16*a*, 16*b* by further rotation of the platen roller 12, then is cut into a page by the engagement of cutter blades 15*a*, 15*b* after the image recording of a page, and finally is discharged.

There are provided an ink sheet feed roller 17 on which the ink sheet 14 is wound, and an ink sheet takeup roller 18 driven by an ink sheet conveying motor to be explained later, for taking up the ink sheet 14 in a direction a. Said feed roller 17 and takeup roller 18 are detachably loaded in an ink sheet loading portion 70 of the apparatus. There are further provided a sensor 19 for detecting the remaining amount and the speed of the ink sheet 14; an ink sheet sensor 20 for detecting the presence of the ink sheet 14; a spring 21 for pressing said thermal head 13 against the platen roller 12 across the recording sheet 11 and the ink sheet 14; a sensor 22 for detecting the presence of the recording sheet; and a roller 72 for guiding the ink sheet 14.

Next there will be explained the structure of the reading unit 100.

A light source 30 illuminates an original 32, and the reflected light is guided, through an optical system (composed of mirrors 50, 51 and a lens 52), to a CCD sensor 31 for conversion into electrical signals. The original 32 is conveyed with a speed corresponding to the reading speed, by means of rollers 53, 54, 55, 56 driven by an unrepresented original conveying motor. Plural originals 32 stacked on an original stacker 57 are guided by a slider 57*a*, separated one by one by the cooperation of a transport roller 54 and a separating piece 58, then advanced to the reading unit 100, and discharged onto a tray 77 after image reading.

A control board 41, constituting the principal part of the control unit 101, sends various control signals to the various units of the apparatus. There are further provided a modem board 106 and an NCU board 107.

Figure 4A:
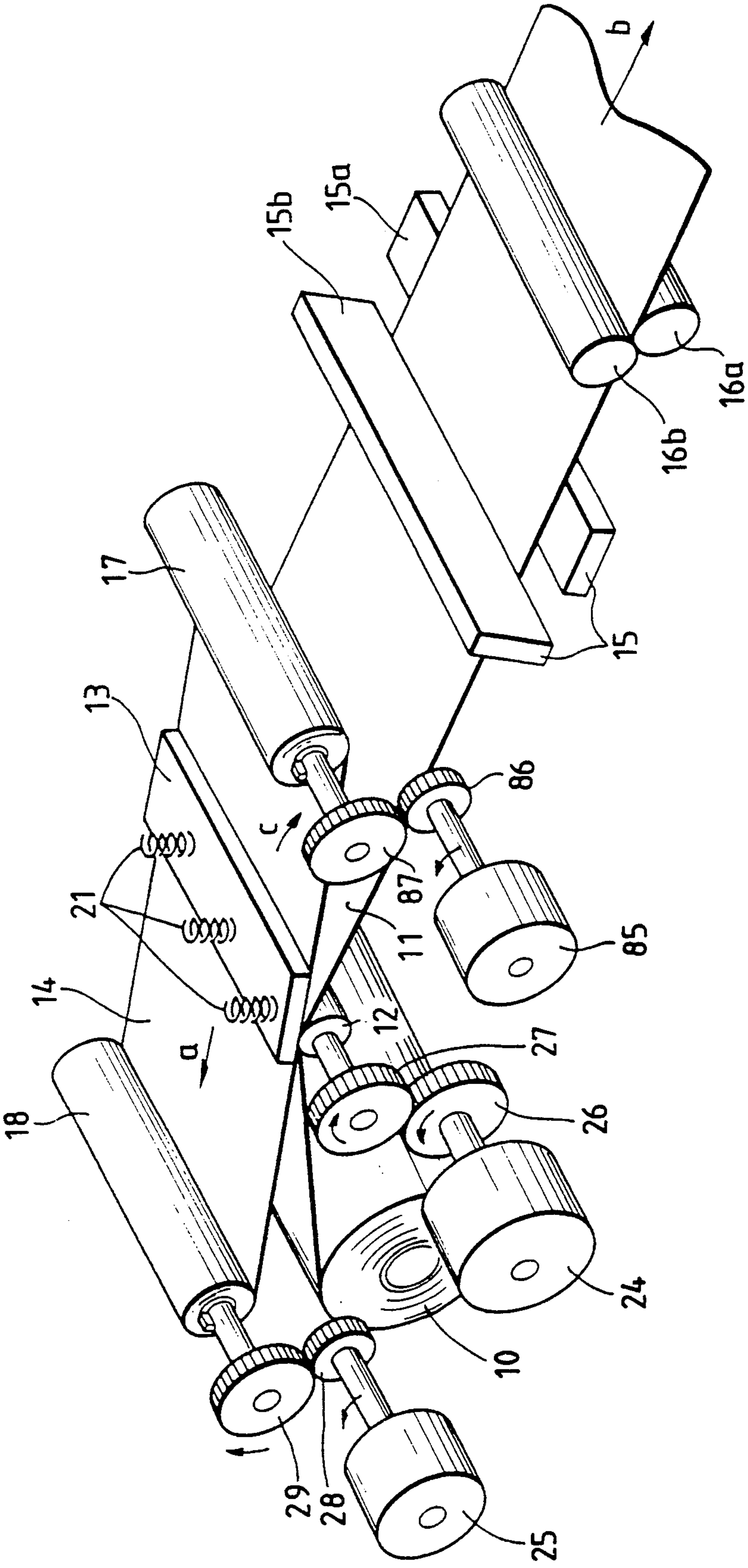
FIGS. 4A and 4B are views showing a transport system for an ink sheet and a recording sheet.
Figure 4B:
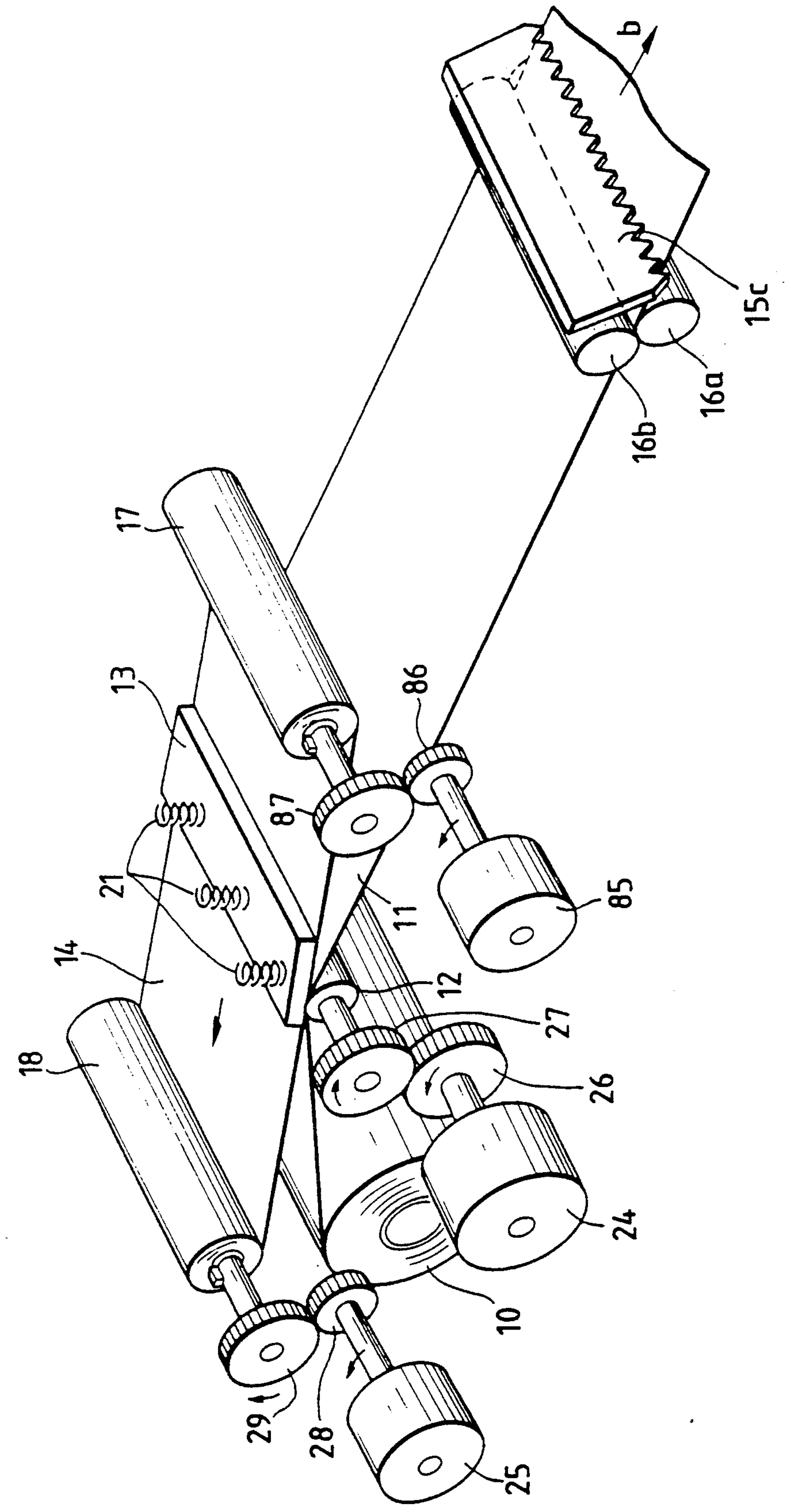

FIGS. 4A and 4B show the details of the transporting mechanism for the ink sheet 14 and the recording sheet 11, wherein the same components as those in the foregoing drawings are represented by the same numbers and will not be explained further.

Referring to FIG. 4A, an ink sheet conveying motor 25 transports the ink sheet 14 in a direction a, and a recording sheet conveying motor 24 rotates the platen roller 12, thereby advancing the recording sheet in a direction b opposite to the direction a. There are further provided gears 26, 27 for transmitting the rotation of the motor 24 to the platen roller 12; and gears 28, 29 for transmitting the rotation of the ink sheet motor 25 to the takeup roller 18. An ink sheet feed motor 85 rotates an ink sheet feed roller 7 through gears 86, 87, said roller 17 being rotated in a direction C when the ink sheet 14 is fed.

As the conveying directions of the recording sheet 11 and the ink sheet 14 ar mutually opposite as explained above, the advancing direction of the ink sheet 14 coincides with the direction of image recording in the longitudinal direction of the recording sheet 11 (direction a, which is opposite to the conveying direction of the recording sheet 11). By assuming that the conveying sheet $V_P$ of the recording sheet 11 as $V_P = -n \cdot V_1$ wherein $V_1$ is the conveying speed of the ink sheet 14 and the negative sign indicates that the conveying direction of the recording sheet 11 is opposite to that of the ink sheet 14, the relative speed of the recording sheet 11 and the ink sheet 4 with respect to the thermal head 13 is represented by:

$$V_{P1} = V_P - V_I = (1/n)V_P$$

which is equal to or larger than $V_P$, and is larger than the relative speed $V_{PI}'(=V_P(1-1/n))$ when the recording sheet 1 and the ink sheet 14 are conveyed in the same direction in the conventional manner.

There is also known a method, in recording n lines with the thermal head 13, of conveying the ink sheet 14 in a direction a by a distance (l/m) for every (n/m) lines (wherein m is an integer satisfying a condition n>m, and l is the length of a line in sub scanning direction), and a method of recording a length L, by conveying the ink sheet 14 with a speed same as that of the recording sheet 11 but in the opposite direction, and rewinding the ink sheet 14 by $L\cdot(n-1)/n$ ($n>1$) prior to the next recording of a predetermined amount. In either case, the relative speed is $V_P$ if the recording is made while the ink sheet 14 is stopped, or $2V_P$ if the recording is made while the ink sheet 14 is moving.

FIG. 4B shows an apparatus in which the cutter 15 is replaced by a manual cutter 15C provided at the downstream side of the discharge rollers 16. Even in such apparatus, similar effects can be obtained by a transport control excluding the backfeed process to be explained later. The following description will be made on the apparatus shown in FIG. 4A.

FIG. 1 shows the electrical connection between the control unit 101 and the recording unit 102 in the facsimile apparatus of the present embodiment wherein the same components as those in the foregoing drawings are represented by the same numbers.

A thermal head 13, which is a line head, is provided with a shift register 130 for receiving serial recording data 43 of a line from the control unit 101, a latch circuit 131 for latching the data of the shift register 130 in response to a latch signal 44, and heat-generating elements 132 consisting of heat-generating resistors of a line. The heat-generating resistors 132 are driven in m blocks, indicated by 132-1 to 132-m. A temperature sensor 133 is mounted on the thermal head 13 for detecting the temperature thereof, and releases an output signal 42, which is A/D converted in the control unit 101 and is supplied to the CPU 113. Thus the CPU 113 detects the temperature of the thermal head 13 and correspondingly regulates the pulse duration of a strobe signal 47 or the driving voltage of the thermal head 13, thereby varying the energy applied thereto according to the characteristics of the ink sheet 14.

The characteristic or species of said ink sheet 14 is designated by the aforementioned switch **103*a*. It may also be identified by a mark printed on the ink sheet 14, or by a mark or a notch provided on a cartridge of the ink sheet 14**.

A drive circuit 46 receives the drive signal for the thermal head 13 from the control unit 101, and generates a strobe signal 47 for driving each block of the thermal head 13. Said drive circuit 46 is capable, by the instruction of the control unit 101, of varying the voltage to a power supply line 45 for current supply to the heat-generating resistors 132 of the thermal head 13, thereby varying the energy supplied thereto. Motor drive circuits 48, 49, 88 serve to respectively drive a recording sheet motor 24, an ink sheet motor 25 and an ink sheet feed motor 85. Said motors 24, 25, 85 are composed of stepping motors in the present embodiment, but they may also be composed for example of DC motors.

Transportation of recording sheet and ink sheet (FIGS. 5-10)

Figure 5:
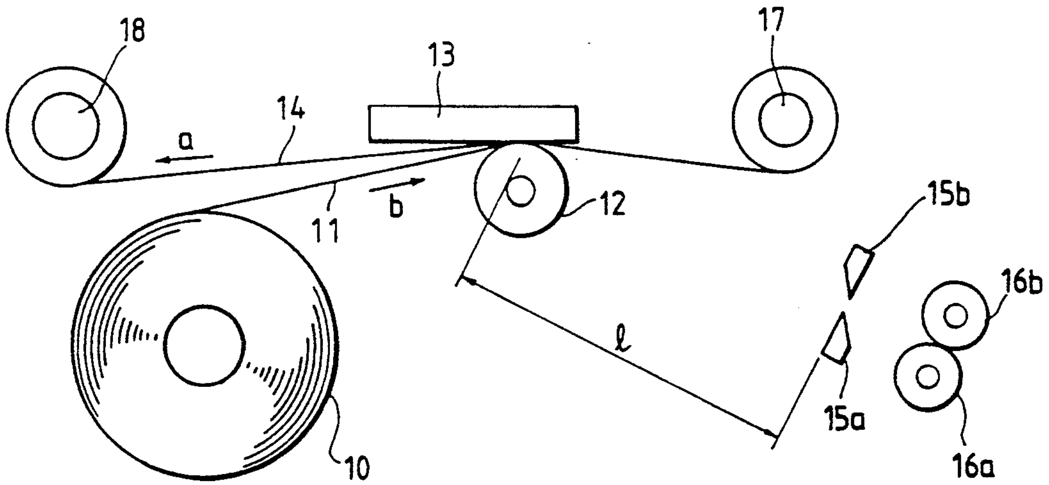
FIGS. 5 to 9 are views showing movement of the recording sheet and the ink sheet in said facsimile apparatus.

FIG. 5 shows the state of the recording sheet 11 and the ink sheet 14 in a stand-by state prior to the start of recording. In this state the leading end portion of the recording sheet 11 is in the recording position by the thermal head 13. When the image recording is started from this state, the recording sheet 11 is transported in a direction b with a speed $V_P$, while the ink sheet 14 is transported in a direction a with a speed $V_I$, wherein said speeds are correlated by $V_I=V_P/n$.

Figure 6:
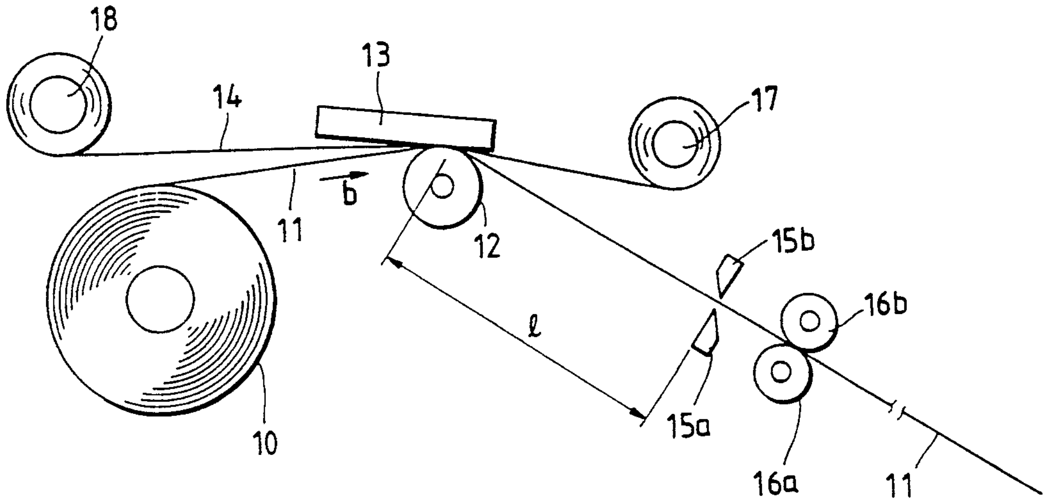
Figure 7:
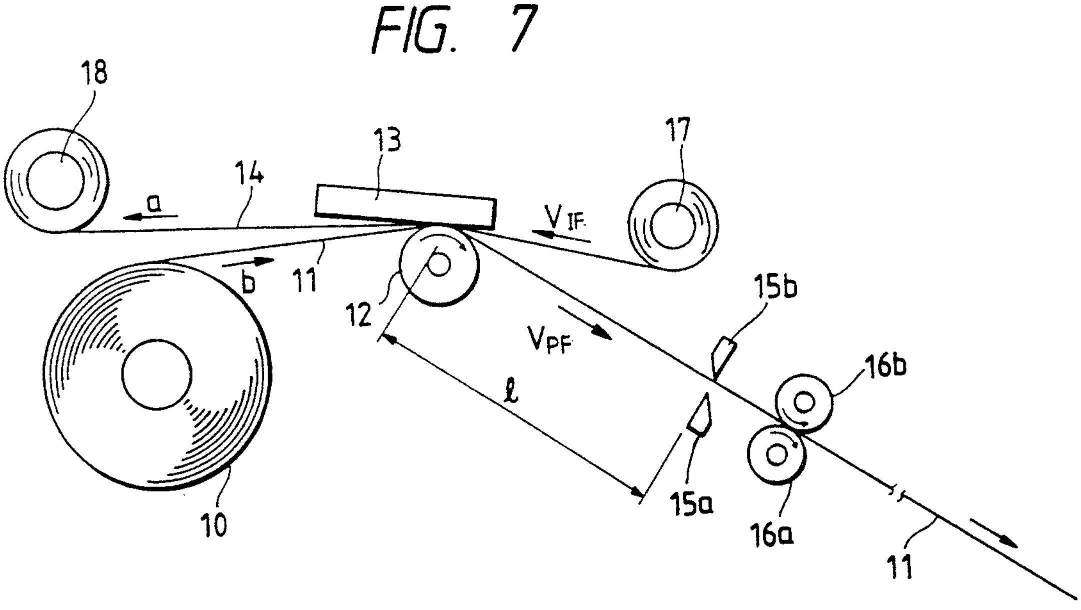

FIG. 6 shows a state after image recording of a page, wherein the trailing end of the recorded page is in contact with the thermal head 13. Therefore, for cutting the page with the cutter 15, the recording sheet 11 has to be transported in the forward direction (b) over a distance l between the recording position of the thermal head 13 and the cutter 15. In this transportation, the recording sheet 11 has a speed $V_{PF}$ while the ink sheet 14 has a speed $V_{IF}$, and said speeds are mutually correlated by $V_{IF}=-V_{PF}/n$. The ink sheet 14 and the recording sheet 11 are transported in mutually opposite directions, as shown in FIG. 7.

Figure 8:
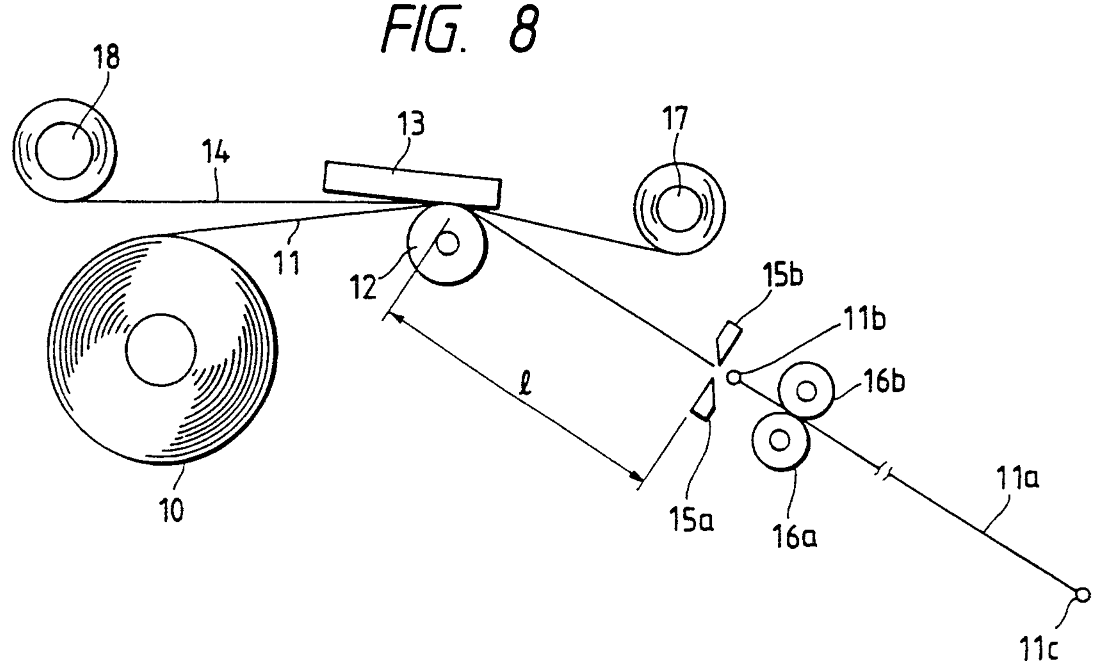

When the recorded sheet 11 is advanced until the rear end portion of the recording reaches the cutting position of the cutter 15, a motor (not shown) for driving the cutter 15 is activated by the control unit 101, whereby the cutter members **15*a*, 15*b* mutually engage to cut the recording sheet 11 into a sheet, as shown in FIG. 8. There are shown the recording sheet 11*a* of a recorded page; a rear end portion 11*b* thereof; and a leading end portion 11*c*** thereof.

Figure 9:
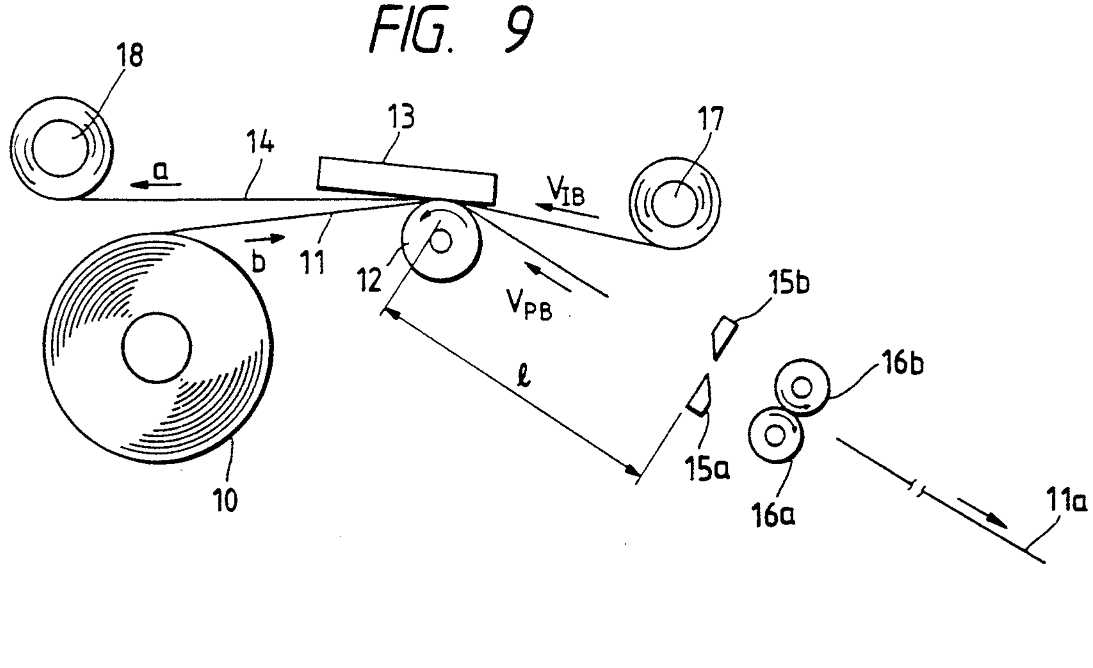

FIG. 9 shows an operation, after the cutting of the recording sheet 11, of reversing the recording sheet 11 in a direction opposite to b, until the leading end of said sheet 11 becomes positioned slightly beyond the recording position of the thermal head 13 toward the discharge rollers 16, thereby preparing for the recording the next page. For the reversing speed $V_{PB}$ of the recording sheet 11, the ink sheet 14 is moved in the direction a with a speed $V_{IB}=V_{PB}/n$. At the same time, the recording sheet **11*a* after recording and cutting is discharged by the rotation of the discharge rollers 16**.

As explained above, in the transportation for the cutting of the recording sheet 11, the ink sheet 14 is moved with a speed equal to 1/n of that of the recording sheet 11, so that the moving distance of the ink sheet 14 becomes shorter (2l/n) in comparison with that of the recording sheet 11, and the waste of the ink sheet 14 is therefore reduced. In the present embodiment it is assumed that the recording sheet 11 and the ink sheet 14 are moved in mutually opposite directions, but the same effect can be obtained also when they are moved in a same direction.

Second embodiment

If the ink sheet 14 contains a slack in the stand-by state shown in FIG. 5, the takeup roller 18 driven by the ink sheet motor 25 at the start of recording operation only serves to absorb said slack and becomes unable to advance the ink sheet 14 with the speed $V_I$. Also in such case, the ink sheet 14 may be moved in the direction b, being dragged by the recording sheet 11 moving with the speed $V_P$.

In the present second embodiment, in order to prevent such phenomenon, the ink sheet 14 is taken up at the backfeeding shown in FIG. 9 with a speed $V_{IB}$ satisfying a condition $V_{IB}\geqq V_{PB}$ wherein $V_{PB}$ is the reversing speed of the recording sheet. This operation avoid formation of slack in the ink sheet 14. It is therefore possible to dispense with the ink sheet feed motor 85 for driving the ink sheet feed roller 17 thereby regulating the amount of feeding of the ink sheet 14 and eliminating the slack therein. In the present embodiment it is assumed that the recording sheet 11 and the ink sheet are moved in mutually opposite directions, but it is likewise exercisable also when said sheets are moved in a same direction.

Figure 10:
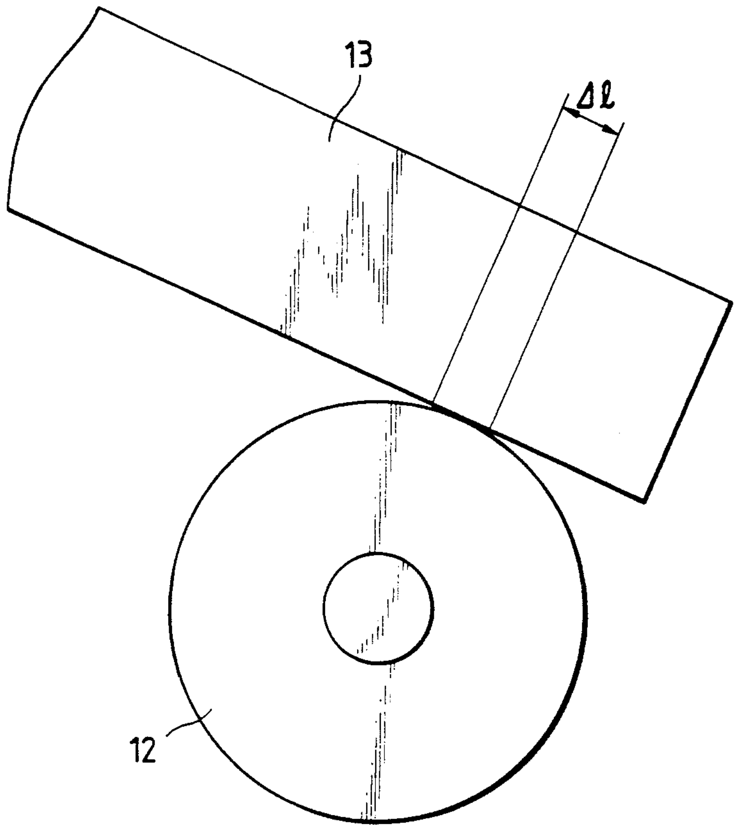
FIG. 10 is a view showing contact area of the thermal head and the platen roller.

Third embodiment (FIG. 10)

In the third embodiment, when the recording sheet 1 is transported in the direction b with a speed $V_{PF}$, the ink sheet is transported with a speed $V_{IF}=V_{PF}/n$. In the backfeeding (opposite to b) of the recording sheet 11, the ink sheet 14 is stopped, and is advanced by k times (k being a natural number) in the same direction as the recording sheet 11 during said backfeeding.

When the ink sheet 14 is stopped it is in sliding contact with the recording sheet 11, as shown in FIG. 10, at the nip Δl of the platen roller 12, thus eventually resulting in so-called background smudge caused by the ink transfer from the ink sheet 11 to the recording sheet 11. In the present embodiment, therefore, there is employed an ink sheet 14 provided with a top coating, and said ink sheet 14 is stopped while said top coating is still present, namely while the background smudge is not generated. Then the ink sheet is advanced, prior to the formation of background smudge, by an amount, for example said nip amount Δl, sufficient for avoiding the formation of background smudge and is stopped again. In this manner the amount of ink sheet 14 wasted in the backfeeding operation can be limited to k×l. In the present embodiment it is assumed that the recording sheet 11 and the ink sheet 14 are moved in mutually opposite directions, but the same effect can be obtained even when they are moved in a same direction.

Fourth embodiment

In the fourth embodiment, when the recording sheet 1 is moved toward the discharge rollers 16 with a speed $V_{PF}$. the ink sheet 14 is moved with a speed $V_{IF}=V_{PF}/n$. Also in the backfeeding of the recording sheet 1 with a speed $V_{PB}$, the ink sheet 14 is moved with a speed $V_{IB}=V_{PB}/n_{IB}$, wherein $n_{IB}>n$. By increasing $n_{IB}$ to an extent not causing the background smudge, it is possible to reduce the waste of the ink sheet 14 resulting from the transportation of the recording sheet 1 at the page cutting thereof. In the present embodiment it is assumed that the recording sheet 11 and the ink sheet 14 are moved in mutually opposite directions, but the same effect can naturally be obtained even if both sheets are moved in a same direction.

The foregoing four embodiments can be summarized as follows:

(1) When the recording sheet is moved in the forward direction with a speed $V_{PF}$, the ink sheet is moved with a speed $V_{IF}=V_{PF}/n_{IF}$ ($n_{IB}$ being equal to n during recording). The recording sheet 11 and the ink sheet 14 may be moved in mutually opposite directions or in the same direction.

(A) First embodiment

In the backfeeding of the recording sheet 11, there is maintained a condition $V_{IB}=V_{PB}/n$, wherein $V_{IB}$ is the speed of recording sheet 11 at the backfeeding, and $n_{IB}$ is equal to n during recording.

(B) Second embodiment

In the backfeeding of the recording sheet 11, there is maintained a condition $V_{IB}\geqq V_{PB}$.

(C) Third embodiment

In the backfeeding of the recording sheet 11, the ink sheet 14 is advanced k times, each by a distance Δl corresponding to the nip amount of the platen roller 12, and is otherwise stopped. "k" indicates a natural number, and Δl is assumed to be sufficiently shorter than the length of the recording sheet.

(D) Fourth embodiment

In the backfeeding of the recording sheet 11, there is maintained a condition $V_{IB}=V_{PB}/n_{IB}$, wherein $n_{IB}$ is larger than n during recording.

There can be considered further variations which are listed in the following:

(2) When the recording sheet 11 is moved in the forward direction with a speed $V_{PF}$, the ink sheet 14 is moved with a speed $V_{IF}=V_{PF}/n_{IF}$ ($n_{IF}$ being larger than n during recording, and the ink sheet 14 being moved in a direction opposite to that of the recording sheet).

(A) Fifth embodiment

In the backfeeding of the recording sheet 11, there is maintained a condition $V_{IB}=V_{PB}/n$, wherein $V_{IB}$ is the speed of ink sheet 14 at the backfeeding, $V_{PB}$ is the speed of recording sheet 11 at the backfeeding, and $n_{IB}$ is equal to n during recording.

(B) Sixth embodiment

In the backfeeding of the recording sheet 11, there is maintained a condition $V_{IB}\geqq V_{PB}$.

(C) Seventh embodiment

In the backfeeding of the recording sheet 11, the ink sheet 14 is advanced k times, each by a distance Δl corresponding to the nip amount of the platen roller 12, and is otherwise stopped. "k" indicates a natural number, and Δl is assumed to be sufficiently shorter than the length of the recording sheet.

(D) Eighth embodiment

In the backfeeding of the recording sheet 11, there is maintained a condition $V_{IB}=V_{PB}/n_{IB}$, wherein $n_{IB}$ is larger than n during recording.

(3) During the sheet feeding, after recording, so as to bring the rear end of a page of the recording sheet 11 to the position of the cutter 15, the ink sheet 14 is advanced k times in the direction a (opposite to the direction of movement of the recording sheet 11), each time by a distance Δl corresponding to the nip amount of the platen roller 12, and is other wise stopped.

(A) Ninth embodiment

In the backfeeding of the recording sheet 11, there is maintained a condition $V_{IB}=V_{PB}/n_{IB}$, wherein $n_{IB}$ is equal to n during recording.

(B) Tenth embodiment

In the backfeeding of the recording sheet 11, there is maintained a condition $V_{IB}>=V_{PB}$.

(C) Eleventh embodiment

In the backfeeding of the recording sheet 11, the ink sheet 14 is advanced k times, each by a distance Δl corresponding to the nip amount of the platen roller 12, and is otherwise stopped. "k" indicates a natural number and Δl is assumed to be sufficiently shorter than the length of the recording sheet.

(D) Twelfth embodiment

In the backfeeding of the recording sheet 11, there is maintained a condition $V_{IB}=V_{PB}/n_{IB}$, wherein $n_{IB}$ is larger than n during recording.

(4) When the recording sheet 11 is fed toward the cutter, the ink sheet 14 is fed by a length in the same direction as the recording sheet 11, with a speed $V_{IF}$. which is equal to $V_{PF}$. After the cutting of the recording sheet 14 with the cutter 15, at the backfeeding of the recording sheet 14, is reversed with a speed $V_{IB}\geqq V_{PB}$ $(=V_{IF})$ Thirteenth embodiment (5) When the recording sheet 11 is moved in the forward direction with a speed $V_{PF}$, the ink sheet 14 is moved with a speed $V_{IF}=V_{PF}/n_{IF}$ ($n_{IF}$ being larger than n during recording, and the ink sheet 14 being moved in the same direction as that of the recording sheet).

(A) Fourteenth embodiment

In the backfeeding of the recording sheet 11, there is maintained a condition $V_{IB}=V_{PB}/n$, wherein $V_{IB}$ is the speed of ink sheet 14 at the backfeeding, $V_{PB}$ is the speed of recording sheet 11 at the backfeeding, and $n_{IB}$ is equal to n during recording.

(B) Fifteenth embodiment

In the backfeedhng of the recording sheet 11, there is maintained a condition $V_{IB}\geqq V_{PB}$.

(6) During the sheet feeding, after recording, so as to bring the rear end of a page of the recording sheet 11 to the position of the cutter 15, the ink sheet 14 is advanced k times in the direction b (same as the direction of movement of the recording sheet each time by a distance Δl corresponding to the nip amount of the platen roller 12, and is otherwise stopped.

(A) Sixteenth embodiment

In the backfeeding of the recording sheet 11, there is maintained a condition $V_{IB}\leqq V_{PB}/n_{IB}$, wherein $n_{IB}$ is equal to n during recording.

(B) Seventeenth embodiment

In the backfeeding of the recording sheet 11, there is maintained a condition $V_{IB}\geqq V_{PB}$.

(C) Eighteenth embodiment

In the backfeeding of the recording sheet 11, the ink sheet 14 is advanced k times, each by a distance A corresponding to the nip amount of the platen roller 12, and is otherwise stopped. "k" indicates a natural number, and Δ is assumed to be sufficiently shorter than the length of the recording sheet.

(D) Nineteenth embodiment

In the backfeeding of the recording sheet 11, there is maintained a condition $V_{IB}=V_{PB}/n_{IB}$, wherein $n_{IB}$ is larger than n during recording.

Figure 11:
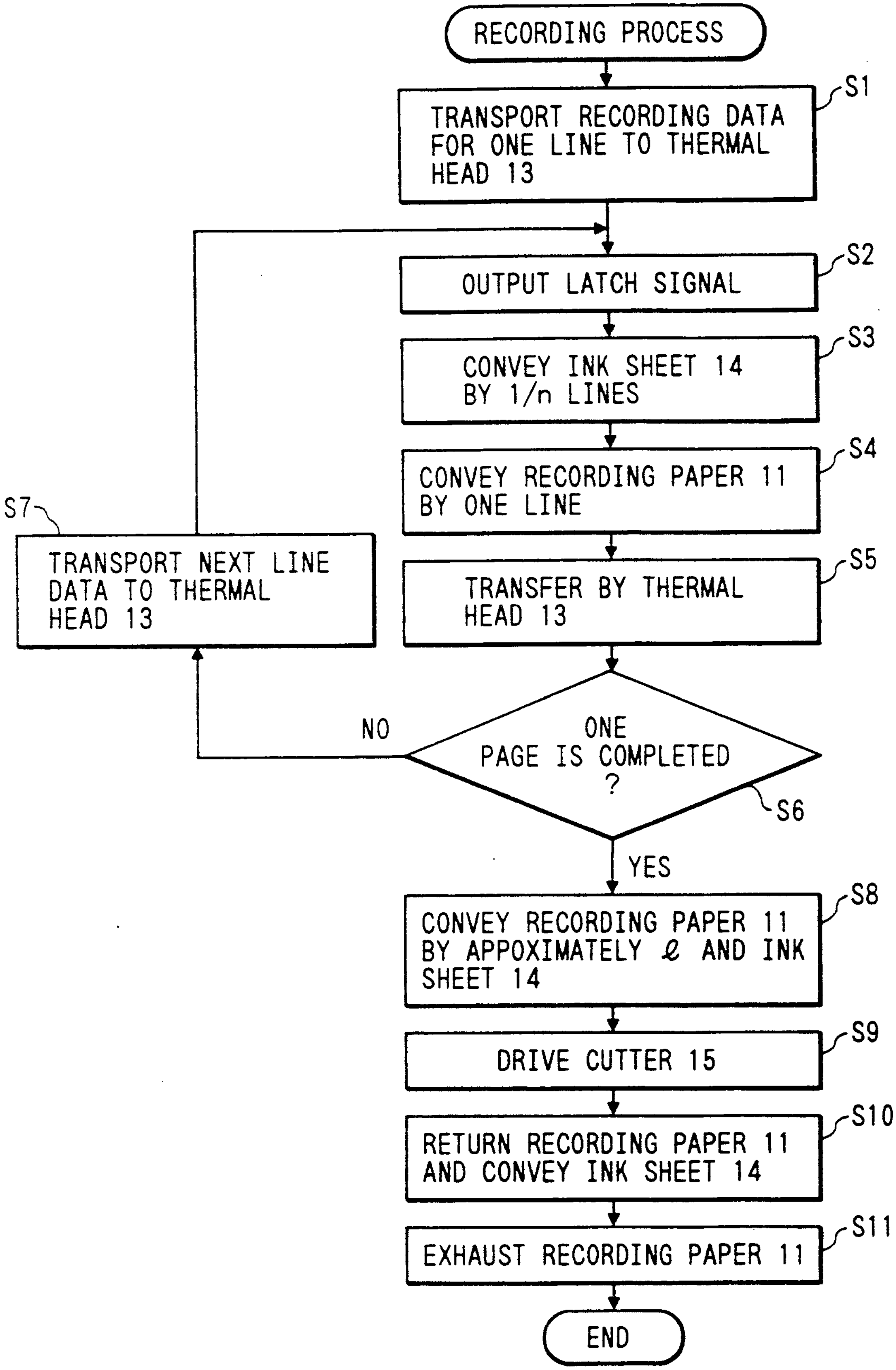
FIG. 11 is a flow chart showing a recording sequence in said facsimile apparatus.
Figure 12:
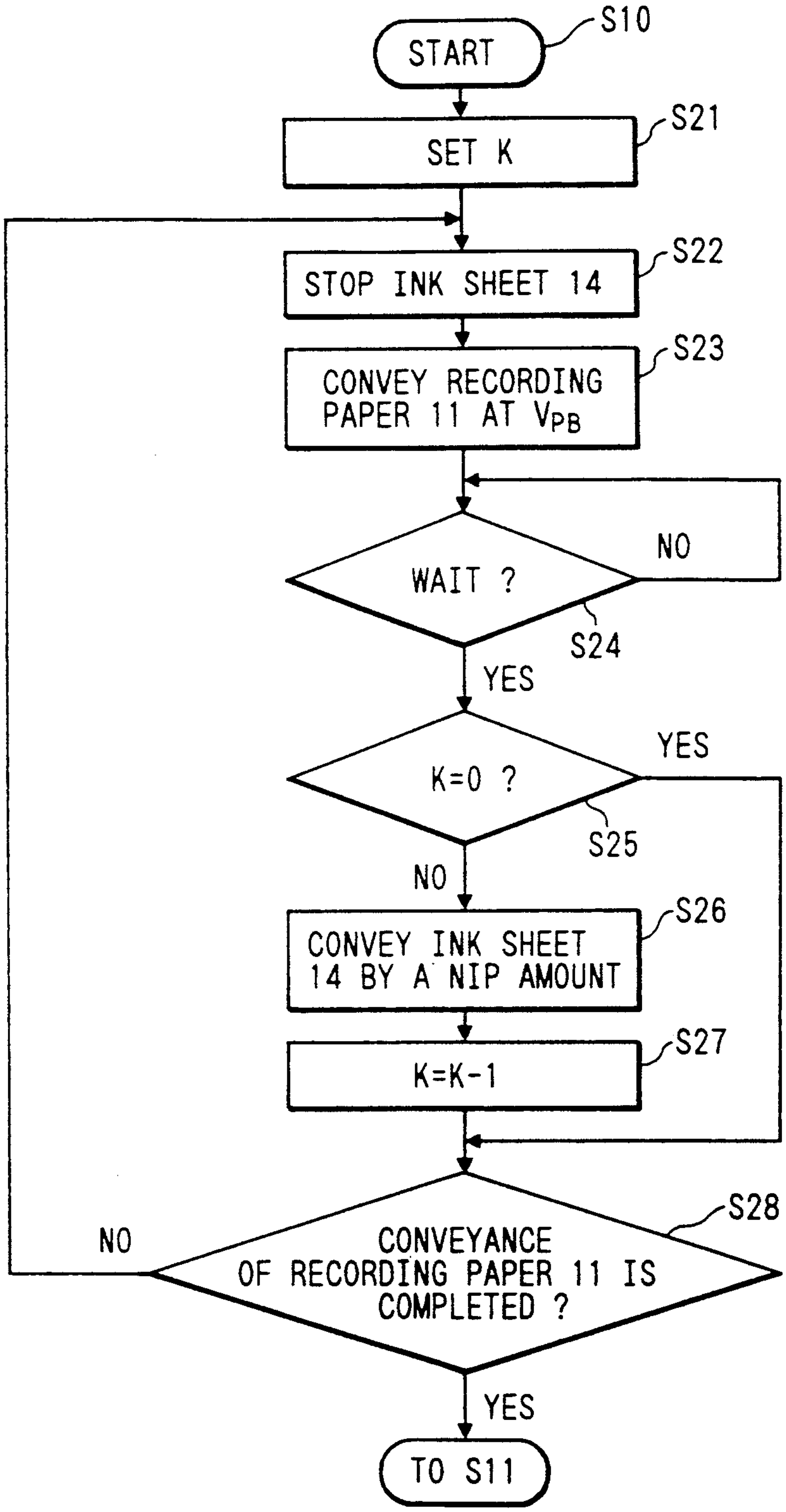
FIG. 12 is a flow chart showing another sequence of a step S10 in FIG. 11.

Recording operation (FIGS. 11 and 12)

FIG. 11 is a flow chart for the recording sequence of a page in the facsimile apparatus of the first embodiment, and a corresponding program is stored in the ROM 114 of the control unit 101.

This sequence is started when the image data of a line to be recorded are stored in the line memory 110 and are ready for recording. At first a step S1 sends the recording data of a line serially to the shift register 130. After the transfer of said data, a step S2 releases the latch signal 44 to store the data of a line in the latch circuit 131. Then a step S3 activates the ink sheet motor 25, thereby advancing the ink sheet 14 by a distance of l/n lines in the direction a shown in FIG. 3. Then a step S4 activates the recording sheet motor 24, thereby advancing the recording sheet 11 by a distance of a line in the direction b. A line corresponds t the length of a dot recorded by the thermal head 13.

A next step S5 energizes the blocks of the heat-generating elements of the thermal head 13 in succession. When the recording of a line is completed by energizations of all m blocks, a step S6 discriminates whether the image recording of a page has been completed. If not completed, a step S7 transfers the recording data of a next line to the shift register 130 of the thermal head 13, and the sequence returns to the step S2 for effecting the recording operation as explained above.

On the other hand, if the step S6 identifies the completion of recording of a page, a step S8 feeds the recording sheet 11 toward the discharge rollers 16*a*, 16*b* approximately by the distance between the recording position of the thermal head 3 and the cutter 15. At the same time the ink sheet motor 25 and the ink sheet feed motor 85 are activated to feed the ink sheet in the direction a with a speed equal to 1/n of that of the recording sheet 11. Then a step S9 activates the cutter members 15*a*, 15*b* to into a page. Then a step S10 feeds the recording sheet 11 backwards to the next recording position. At the same time the ink sheet is fed with a speed equal to 1/n of the backfeeding speed of the recording sheet 11. Then a step S11 discharges the recorded sheet 11*a* from the apparatus by means of the discharge rollers 16.

The second embodiment can be achieved by executing the step S8 in the same manner as explained above, 20 and maintaining, in the step S10, the feed speed $V_{IB}$ of the ink sheet 14 equal to or larger than the backfeed speed $V_{PB}$ of the recording sheet 11 ($V_{IB}\geqq V_{PB}$).

FIG. 12 is a flow chart for the feeding of the recording sheet 11 and the ink sheet 14 at the backfeeding in the 3rd embodiment, corresponding to the step S10 in FIG. 11.

A step S21 sets the value k, and a step S22 stops the feeding of the ink sheet 14. Then a step S23 feeds the recording sheet 11 with a speed $V_{PB}$. Then a step S24 awaits the lapse of a predetermined time, corresponding to the time required for the abrasion of the top coating of the ink sheet 14 and the formation of smudge on the recording sheet 11 resulting from the friction between the recording sheet 11 and the ink sheet 14. After the lapse of said time, a step S25 discriminates whether "k" is "0", and, if not, a step S26 feed by the ink sheet 14 by the nip amount Δl shown in FIG. 10. Then a step S27 decreases the value of k by "1", and a step S28 terminates the feeding of the recording sheet 11.

The fourth embodiment can be achieved, in the step S10 shown in FIG. 11, by feeding the ink sheet, at the backfeeding of the recording sheet 11, with a speed equal to $1/n_{IB}$ of the speed $V_{PB}$ of the recording sheet 11, wherein $n_{IB}>n$.

The feeding of the recording sheet 11 and the ink sheet 14 in other embodiments can be realized in a similar manner.

If the ink sheet motor 25 is a stepping motor, the aforementioned value n can be controlled by varying the number of steps of the ink sheet 14 during the feeding of a line of the recording sheet 11, or by varying the minimum stepping angle of said motor.

Figure 13:
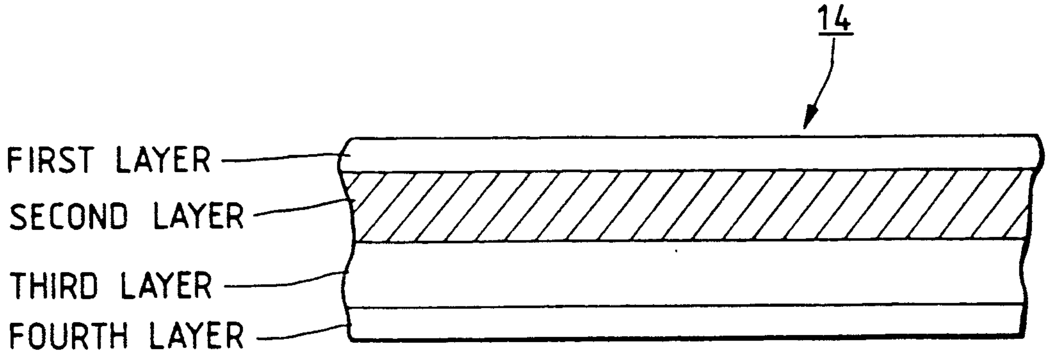
FIG. 13 is a cross-sectional view of an ink sheet employed in said embodiment.

Ink sheet (FIG. 13)

FIG. 13 is a cross-sectional view of the ink sheet 14 to be employed in the multi-printing of the present invention, for example having a four-layered structure.

A second layer is composed of a base film, serving as the substrate for the ink sheet 14. Since thermal energy is repeatedly applied to a same position in case of multi-printing, it is preferably composed of an aromatic polyamide film or condenser paper which ester film can also be used for this purpose. Its thickness should be as small as possible for improving the print quality, but is preferably in a range of 3–8 μm in consideration of the mechanical strength.

A third layer is composed of an ink layer capable of transfers of n times to the recording sheet. It is principally composed of an adhesive A fourth layer is a top coating layer for preventing the pressure transfer of the ink to the recording sheet, and is composed for example of transparent wax. Thus the pressure transfer takes place only in said 4th layer, and the background smear on the recording sheet can be prevented. A first layer is a heat-resistant coating for protecting the base film of the second layer from the heat of the thermal head. Said heat-resistant layer is preferable for multi-printing in which heat energy of plural lines may be applied to a same position (if black dots occur repeatedly), but it may be dispensed with if desirable. It is particularly effective for a base film of relatively low heat resistance, such as polyester film.

The ink sheet is not limited to the above-explained example, and there may be employed an ink sheet composed of a base layer and a porous ink support layer provided on one side of the base layer and impregnated with ink, or an ink sheet composed of a base film and a heat-resistant ink layer having porous network structure and impregnated with ink therein.

Also the base film can be composed, for example, of polyimide, polypropylene, polyvinyl chloride, triacetyl cellulose, nylon or paper. The heat-resistant coating, which is no indispensable, can be composed, for example, of silicone resin, epoxy resin or melamine resin.

Furthermore, the ink coated on the ink sheet can be thermo-sublimable, instead of thermo fusible. Such thermo-sublimable ink sheet can be composed, for example, of a substrate consisting of polyethylene terephthalate, polyethylene naphthalate or aromate polyamide, and a layer of coloring material, containing spacer particles, composed of guanamine resin and fluorinated resin, and a dye.

Also the method of heating is not limited to the heating with thermal head explained above, but can involve transfer by current application or the transfer with laser beam irradiation.

In the foregoing embodiments it is assumed that the recording sheet 11 and the ink sheet 14 are moved in mutually opposite directions, but they may be moved in the same direction.

Also the recording medium is not limited to paper but can be any material accepting the ink transfer, such as cloth or plastic sheet. Also the loading of the ink sheet is not limited to the structures shown in the foregoing embodiments, but can be achieved by so-called ink sheet cassette which contains ink sheets in a casing.

As explained in the foregoing, the embodiments prevent the formation of creases or slack in the ink sheet or smudges on the surface of the recording sheet, by advancing the ink sheet in the forward direction by a predetermined amount, in the forward feeding of the recording sheet toward the discharge slot and back feeding thereof into the apparatus after the recording of a page.

Also there is obtained an effect of reducing the consumption of the ink sheet, by reducing the amount of feeding thereof in comparison with that of the recording sheet.

Furthermore, the operator can select the amount of feeding of the ink sheet for a line of the recording sheet, in consideration of the length of the information to be recorded and the remaining amount of the ink sheet.

Though the foregoing embodiments have been explained by a recording unit in a facsimile apparatus, they are not limited to such case and are likewise applicable to ordinary thermal transfer printers.

As explained in the foregoing, the present invention prevents the formation of creases or slack in the ink sheet or the formation of creases on the surface of recording medium, by feeding the ink sheet in predetermined amounts in response to the feeding of the recording medium.

What is claimed is:

1. A thermal transfer recording apparatus for image recording by transferring ink of an ink sheet to a recording medium, comprising:

recording means for acting on said ink sheet thereby recording an image on said recording medium;

ink sheet feed means for feeding said ink sheet;

recording medium feed means for feeding said recording medium; and controlling means for controlling which cause said ink sheet to be conveyed at a speed lower than that of said recording medium in a predetermined direction when said recording medium is conveyed following image recording by said recording means.

2. A thermal transfer recording apparatus for image recording by transferring ink of an ink sheet to a recording medium, comprising:

recording means for acting on said ink sheet thereby recording an image on said recording medium;

ink sheet feed means for feeding said ink sheet;

recording medium feed means for feeding said recording medium; and controlling means for controlling which cause said ink sheet to be conveyed at a speed higher than that of said recording medium in a predetermined direction when said recording medium is conveyed following image recording by said recording means.

3. An apparatus according to claims 1 or 2 wherein said ink sheet feed means is adapted, during image recording with said recording means, to feed said ink sheet with a speed lower than that of said recording medium.

4. An apparatus according to claims 1 or 2 wherein during image recording on said recording medium said ink sheet is moved a first distance and said recording medium is moved a second distance, said first distance being no greater than said second distance.

5. A thermal transfer recording apparatus for image recording by transferring ink of an ink sheet to a recording medium, comprising:

recording means for acting on said ink sheet thereby recording an image on said recording medium;

ink sheet feed means for feeding said ink sheet;

recording medium feed means for feeding said recording medium; and control means for feeding, during image recording with said recording means, said ink sheet with a speed equal to $1/n$ ($n>1$) of that of said recording medium, and, in a forward feeding of said recording medium in a forward direction toward a discharge end with a speed $V_{PF}$ after image recording, feeding said ink sheet with a speed $V_{IF}=V_{PF}/n_{IF}$, wherein $n_{IF}$ is equal to n during the image recording.

6. An apparatus according to claim 5, wherein said control means is adapted, in a backward feeding of said recording medium, to maintain a condition $V_{IB}=V_{PB}/n_{IB}$ wherein $V_{IB}$ is a speed of said ink sheet at the backward feeding, $V_{PB}$ is a speed of said recording medium in said backward feeding, and $n_{IB}$ is equal to n during the image recording.

7. An apparatus according to claim 5, wherein said control means is adapted, in a backward feeding of said recording medium, to maintain a condition $V_{IB} \geqq V_{PB}$.

8. An apparatus according to claim 5, wherein said control means is adapted, in a backward feeding of said recording medium, to feed said ink sheet k times each by a nip amount Δl of a platen roller, wherein k is a natural number and Δl is sufficiently smaller than a length of the recording medium, and to maintain said ink sheet in other times.

9. An apparatus according to claim 5, wherein said control means is adapted, in a backward feeding of said recording medium, to maintain a condition $V_{IB}=V_{PB}/n_{IB}$, wherein $n_{IB}$ is larger than n during the image recording.

10. A thermal transfer recording apparatus for image recording by transferring ink of an ink sheet to a recording medium, comprising:

recording means for acting on said ink sheet thereby recording an image on said recording medium;
ink sheet feed means for feeding said ink sheet; and
recording medium feed means for feeding said recording medium;
wherein said ink sheet is fed during image recording with said recording means, with a speed equal to 1/n (n>1) of that of said recording medium, and is fed, at the feeding of said recording medium with a speed $V_{PF}$ toward a discharge end after the image recording, with a speed $V_{IF}=V_{PF}/n_{IF}$ ($n_{IF}$ being larger than n during the image recording), in a direction opposite to a direction toward the discharge end.

11. An apparatus according to claim 10, wherein, in a backward feeding of said recording medium, there is maintained a condition $V_{IB}=V_{PB}/n_{IB}$ in which $V_{IB}$ is a speed of said ink sheet in the backward feeding, $V_{PB}$ is a speed of said recording medium in the backward feeding, and $n_{IB}$ is equal to n during the image recording.

12. An apparatus according to claim 10, wherein, at a backward feeding of said recording medium, there is maintained a condition $V_{IB} \geqq V_{PB}$.

13. An apparatus according to claim 10, wherein, at a backward feeding of said recording medium, the ink sheet is fed k times each by a nip amount Δl of a platen roller, wherein k is a natural number and Δl is assumed to be sufficiently smaller than a length of the recording medium, and the ink sheet is stopped in other times.

14. An apparatus according to claim 10, wherein, at a backward feeding of said recording medium, there is maintained a condition $V_{IB}=V_{PB}/n_{IB}$ wherein $n_{IB}$ is larger than n during the image recording.

15. A thermal transfer recording apparatus for image recording by transferring ink of an ink sheet to a recording medium, comprising:

recording means for acting on said ink sheet thereby recording an image on said recording medium;
ink sheet feed means for feeding said ink sheet;
recording medium feed means for feeding said recording medium; and
control means for feeding said ink sheet, during image recording with said recording means, with a speed equal to 1/n (n>1) of that of said recording medium, and also feeding said ink sheet, when said recording medium is fed after image recording so as to bring a rear end of image area on said recording medium to a cutter position, in k times each by a nip amount Δl in a direction opposite to that of feeding of said recording medium, but stopping said ink sheet in other times.

16. An apparatus according to claim 15, wherein said control means is adapted, at a backward feeding of said recording medium, to maintain a condition $V_{IB}=V_{PB}/n_{IB}$ wherein $V_{IB}$ is a speed of said ink sheet in the backward feeding, $V_{PB}$ is a speed of said recording medium in the backward feeding, and $n_{IB}$ is equal to n during the image recording.

17. An apparatus according to claim 15, wherein said control means is adapted, in a backward feeding of said recording medium, to maintain a condition $V_{IB} \geqq V_{PB}$.

18. An apparatus according to claim 15, wherein said control means is adapted, in a backward feeding of said recording medium, to feed said ink sheet k times each by a nip amount Δl of a platen roller, wherein k is a natural number and is sufficiently smaller than the length of the recording medium, and to stop said ink sheet in other times.

19. An apparatus according to claim 15, wherein said control means is adapted, in a backward feeding of said recording medium, to maintain a condition $V_{IB}=V_{PB}/n_{IB}$, wherein $n_{IB}$ is larger than n during the image recording.

20. A thermal transfer recording apparatus for image recording by transferring ink of an ink sheet to a recording medium, comprising:

recording means for acting on said ink sheet thereby recording an image on said recording medium;
ink sheet feed means for feeding said ink sheet;
recording medium feed means for feeding said recording medium;
cutter means for cutting said recording medium; and
control means for feeding said ink sheet, during image recording with said recording means, with a speed equal to 1/n (n>1) of that of said recording medium, then, in a feeding of said recording medium with a speed $V_{PF}$ toward said cutter after image recording, feeding said ink sheet by a length l with a speed $V_{IF}=V_{PF}$ in the same direction as that of feeding of said recording medium, and, in a backward feeding of said recording medium after cutting thereof with said cutter, reversing said ink sheet with a speed $V_{IB} \geqq V_{PB}$ ($=V_{IF}$).

21. A thermal transfer recording apparatus for image recording by transferring ink of an ink sheet to a recording medium, comprising:

recording means for acting on said ink sheet for recording an image on said recording medium;
ink sheet feed means for feeding said ink sheet;
recording medium feed means for feeding said recording medium; and
control means for feeding said ink sheet, during image recording with said recording means, with a speed equal to 1/n (n>1) of that of said ink sheet, and feeding said ink sheet, during feeding of said recording medium with a speed $V_{PF}$ toward a discharge end after the image recording, with a speed $V_{IF}=V_{PF}/n_{IF}$ ($n_{IF}$ being equal to n during the image recording) in a same direction as that of movement of said recording medium.

22. An apparatus according to claim 21, wherein said control means is adapted, in a backward feeding of said recording medium, to maintain a condition $V_{IB}=V_{PB}/n_{IB}$, wherein $V_{IB}$ is a speed of said ink sheet at the backward feeding, $V_{PB}$ is a speed of said recording medium at said backward feeding, and $n_{IB}$ is equal to n during the image recording.

23. An apparatus according to claim 21, wherein said control means is adapted, in a backward feeding of said recording medium, to maintain a condition $V_{IB} \geqq V_{PB}$.

24. A thermal transfer recording apparatus for image recording by transferring ink of an ink sheet to a recording medium, comprising:

recording means for acting on said ink sheet thereby recording an image on said recording medium;

ink sheet feed means for feeding said ink sheet;

recording medium feed means for feeding said recording medium; and control means for feeding said ink sheet, during image recording with said recording means, with a speed equal to 1/n (n>1) of that of said recording medium, and, after the image recording, feeding said ink sheet k times each by a nip amount Δl of a platen roller in a same direction as that of feeding said recording medium, but stopping said ink sheet in other times.

25. An apparatus according to claim 24, wherein said control means is adapted, in a backward feeding of said recording medium, to maintain a condition $V_{IB}=V_{PB}/n_{IB}$, wherein $V_{IB}$ is a speed of said ink sheet in the backward feeding, $V_{PB}$ is a speed of the recording medium in the backward feeding, and $n_{IB}$ is equal to n during the image recording.

26. An apparatus according to claim 24, wherein said control means is adapted, in a backward feeding of said recording medium, to maintain a condition $V_{IB} \geqq V_{PB}$.

27. An apparatus according to claim 24, wherein said control means is adapted, in a backward feeding of said recording medium, to feed said ink sheet k times each by a nip amount Δl of the platen roller, wherein k is a natural number and Δl is sufficiently smaller than a length of the recording medium, and stopping said ink sheet in other times.

28. An apparatus according to claim 24, wherein said control means is adapted, in a backward feeding of said recording medium, to maintain a condition $V_{IB}=V_{PB}/n_{IB}$, wherein $n_{IB}$ is larger than n during the image recording.

29. An apparatus according to claims 1, 2, 5, 10, 15, 20, 21 or 24, wherein the ink of said ink sheet is thermofusible.

30. An apparatus according to claims 1, 2, 5 10, 15, 20, 21 or 24, wherein the ink of said ink sheet is thermosublimable.

31. An apparatus according to claims 1, 2, 5, 5, 21 or 24, further comprising cutter means for cutting said recording medium after image recording.

32. A thermal transfer recording method for image recording on a recording medium by transferring ink of an ink sheet to said recording medium;

wherein said ink sheet is fed, after the image recording on said recording medium, with a speed lower than a speed of said recording medium.

33. A thermal transfer recording method for image recording on a recording medium by transferring ink of an ink sheet to said recording medium;

wherein said ink sheet is fed, after the image recording on said recording medium with a speed higher than a speed of said recording medium.

34. A facsimile apparatus capable of image recording by transferring ink of an ink sheet to a recording medium, comprising:

reader means for reading an original image;

means for transmitting or receiving information;

recording means for acting on said ink sheet thereby recording an image on said recording medium;

ink sheet feed means for feeding said ink sheet;

recording medium feed means for feeding said recording medium; and controlling means for controlling which cause said ink sheet to be conveyed at a speed lower than that of said recording medium in a predetermined direction when said recording medium is conveyed following image recording by said recording means.

35. A facsimile apparatus capable of image recording by transferring ink of an ink sheet to a recording medium, comprising:

reader means for reading an original image;

means for transmitting or receiving information;

recording means for acting on said ink sheet thereby recording an image on said recording medium;

ink sheet feed means for feeding said ink sheet;

recording medium feed means for feeding said recording medium; and controlling means for controlling which cause said ink sheet to be conveyed at a speed higher than that of said recording medium in a predetermined direction when said recording medium is conveyed following image recording by said recording means.

36. A method or an apparatus according to claims 32, 33, 34 or 35, wherein the speed of said ink sheet does not exceed that of said recording medium.

37. An apparatus as in claims 1, 2, 34 or 35 wherein said controlling means conveys said ink sheet in a direction opposite to a conveyance direction of said recording medium when said recording medium is conveyed following image recording.

38. An apparatus as in claims 1, 2, 34 or 35 wherein said controlling means conveys said ink sheet in the same direction as a conveyance direction of said recording medium when said recording medium is conveyed following image recording.

39. An apparatus as in claims 1, 2, 34 or 35 wherein said apparatus is a front feeding apparatus which conveys said recording medium so that a rear end of the image on said recording medium passes through a cutter position when said recording medium is conveyed following image recording by said recording means, said rear end being the last part of said recording medium to pass through said cutter.

40. An apparatus as in claims 1, 2, 34 or 35 wherein said apparatus is a back feeding apparatus which conveys said recording medium so that a leading edge of the image on said recording medium returns to a recording position by said recording means after cutting by a cutter when said recording medium is conveyed following image recording by said controlling means, said leading edge being the first part of said recording medium to pass through said cutter upon commencement of a subsequent recording.

* * * * *

UNITED STATES PATENT AND TRADEMARK OFFICE
CERTIFICATE OF CORRECTION

PATENT NO. : 5,122,882

DATED : June 16, 1992

INVENTOR(S) : YASUSHI ISHIDA ET AL.

It is certified that error appears in the above-identified patent and that said Letters Patent is hereby corrected as shown below: ON THE TITLE PAGE:

AT [54] TITLE

"CONTROL RECORDING" should read --CONTROL OF RELATIVE SPEED BETWEEN INK SHEET AND RECORDING--.

COLUMN 1

Line 3, "CONTROL RECORDING" should read --CONTROL OF RELATIVE SPEED BETWEEN INK SHEET AND RECORDING--.
Line 16, "or like." should read --or the like.--.
Line 18, "the" should be deleted.
Line 43, "multi print" should read --multi-print--.
Line 45, "multi print" should read --multi-print--.

COLUMN 2

Line 52, "DESCRIPTION" should read --DETAILED DESCRIPTION--.
Line 53, "DETAILED" should be deleted.
Line 62, "connection" should read --connections--.

COLUMN 3

Line 29, "operations" should read --for operations--.

UNITED STATES PATENT AND TRADEMARK OFFICE
CERTIFICATE OF CORRECTION

PATENT NO. : 5,122,882

DATED : June 16, 1992

INVENTOR(S) : YASUSHI ISHIDA ET AL.

It is certified that error appears in the above-identified patent and that said Letters Patent is hereby corrected as shown below:

COLUMN 4

Line 42, "direction C" should read --direction c--.
Line 45, "ar" should read --are--.
Line 56, "ink sheet 4" should read --ink sheet 14--.
Line 59, "$V_{p1}=V_p-V_1=(1/n)V_p$" should read --$V_{p1}=V_p-V_1=(1+1/n)V_p$--.
Line 63, "sheet 1" should read --sheet 11--.

COLUMN 5

Line 1, "sub scanning" should read --sub-scanning--.
Line 3, "same" should read --the same--.
Line 17, "connection" should read --connections--.
Line 19, "embodiment" should read --embodiment,--.

COLUMN 6

Line 15, "recorded sheet 11" should read --recording sheet 11--.
Line 62, "avoid" should read --avoids--.
Line 68, "sheet" should read --sheet 14--.

UNITED STATES PATENT AND TRADEMARK OFFICE
CERTIFICATE OF CORRECTION

PATENT NO. : 5,122,882

DATED : June 16, 1992

INVENTOR(S) : YASUSHI ISHIDA ET AL.

It is certified that error appears in the above-identified patent and that said Letters Patent is hereby corrected as shown below:

COLUMN 7

Line 5, "recording sheet 1" should read --recording sheet 11--.
Line 13, "stopped it" should read --stopped, it--.
Line 16, "ink sheet 11" should read --ink sheet 14--.
Line 34, "1" should read --11--.
Line 37, "sheet 1" should read --sheet 11--.
Line 42, "recording sheet 1" should read --recording sheet 11--.
Col. 8, Line 48, "$V_{IB}$>=$V_{PB}$." should read --$V_{IB} \geq V_{PB}$.--.

COLUMN 9

Line 14, "backfeedhng" should read --backfeeding--.
Line 20, "sheet each" should read --sheet 11), each--.
Line 25, "$V_{IB} \leq V_{PB}/n_{IB}$," should read --$V_{IB} = V_{PB}/n_{IB}$,--.
Line 32, "distance A" should read --distance Δ--.
Line 38, close up left margin.
Line 59, "t" should read --to--.

COLUMN 10

Line 6, "distance" should read --distance ℓ--.
Line 7, "thermal head 3" should read --thermal head 13--.
Line 12, "to into" should read --to cut the recording sheet into--
Line 21, "20" should be deleted.
Line 26, "3rd" should read --third--.
Line 37, "feed by" should read --feeds--.
Line 64, "which ester" should read --which has a high heat resistance, but a conventional polyester--.

UNITED STATES PATENT AND TRADEMARK OFFICE
CERTIFICATE OF CORRECTION

PATENT NO. : 5,122,882

DATED : June 16, 1992

INVENTOR(S) : YASUSHI ISHIDA ET AL.

It is certified that error appears in the above-identified patent and that said Letters Patent is hereby corrected as shown below:

COLUMN 11

Line 3, "adhesive" should read --adhesive such as EVA resin, a coloring material such as carbon black or nigrosin dye, and a binder such as carnauba wax or paraffin wax, so as to be usable n times in a same position. The coating amount of said layer is preferably in a range of 4-8 $g/m^2$, but can be arbitrarily selected according to the desired sensitivity and density.--.
Line 7, "4th" should read --fourth--.
Line 27, "no" should read --not--.
Line 30, "thermo fusible." should read --thermo-fusible.--.
Line 33, "aromate" should read --aromatic--.

COLUMN 12

Line 5, "creases" should read --smudge--.
Line 36, "2 wherein" should read --2, wherein--.
Line 42, "2 wherein" should read --2, wherein--.

COLUMN 14

Line 18, "the" should read --a--.

COLUMN 15

Line 50, "5 10," should read --5, 10,--.
Line 53, "5, 21" should read --10, 15, 21--.

UNITED STATES PATENT AND TRADEMARK OFFICE

CERTIFICATE OF CORRECTION

PATENT NO. : 5,122,882
DATED : June 16, 1992
INVENTOR(S) : YASUSHI ISHIDA ET AL.

It is certified that error appears in the above-identified patent and that said Letters Patent is hereby corrected as shown below:

COLUMN 16

Line 2, "medium" should read --medium,--.
Line 37, "35 wherein" should read --35, wherein--.
Line 42, "35 wherein" should read --35, wherein--.
Line 47, "35 wherein" should read --35, wherein--.
Line 55, "35 wherein" should read --35, wherein--.

Signed and Sealed this

Twenty-fourth Day of November, 1992

*Attest:*

DOUGLAS B. COMER

*Attesting Officer* *Acting Commissioner of Patents and Trademarks*

UNITED STATES PATENT AND TRADEMARK OFFICE
CERTIFICATE OF CORRECTION

PATENT NO. : 5,122,882

DATED : June 16, 1992

INVENTOR(S) : yasushi Ishida, et al

It is certified that error appears in the above-identified patent and that said Letters Patent is hereby corrected as shown below:

On the Title Page, Item [54]:

Change Title to read
--THERMAL TRANSFER RECORDING METHOD AND APPARATUS WITH CONTROL OF RELATIVE SPEED BETWEEN INK SHEET AND RECORDING MEDIUM BEFORE, DURING, AND FOLLOWING RECORDING--.

<u>COLUMN 1</u>

Lines 1-5, Title should read
--THERMAL TRANSFER RECORDING METHOD AND APPARATUS WITH CONTROL OF RELATIVE SPEED BETWEEN INK SHEET AND RECORDING MEDIUM BEFORE, DURING, AND FOLLOWING RECORDING--.

Signed and Sealed this

Seventh Day of December, 1993

*Attest:*

Bruce Lehman

BRUCE LEHMAN

*Attesting Officer*

*Commissioner of Patents and Trademarks*